Dec. 9, 1952 E. T. RIDGWAY 2,621,059
UNDERFRAME STRUCTURE FOR LAND VEHICLES, ESPECIALLY TRAILERS
Filed March 3, 1948 4 Sheets-Sheet 1
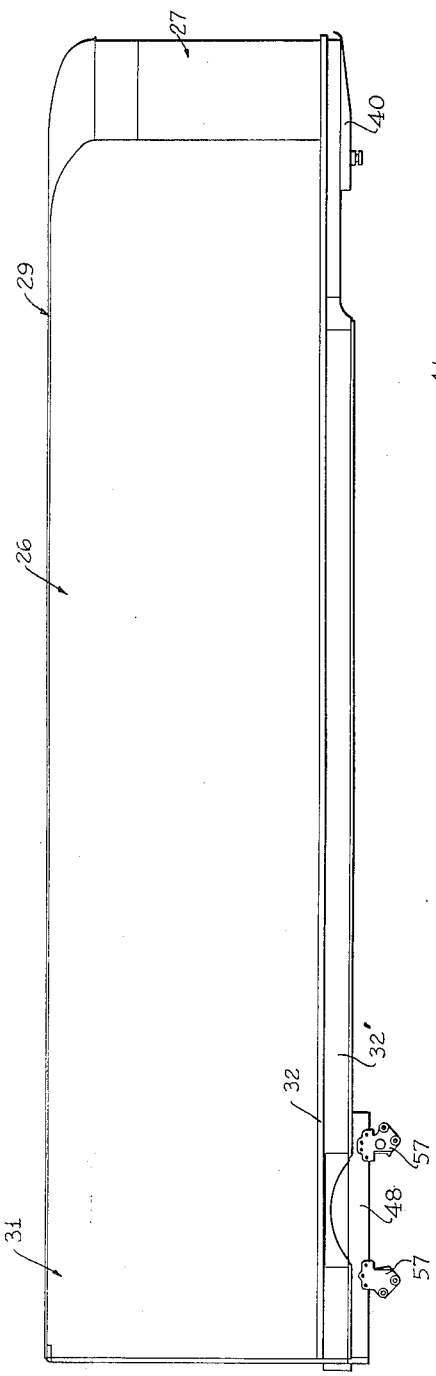
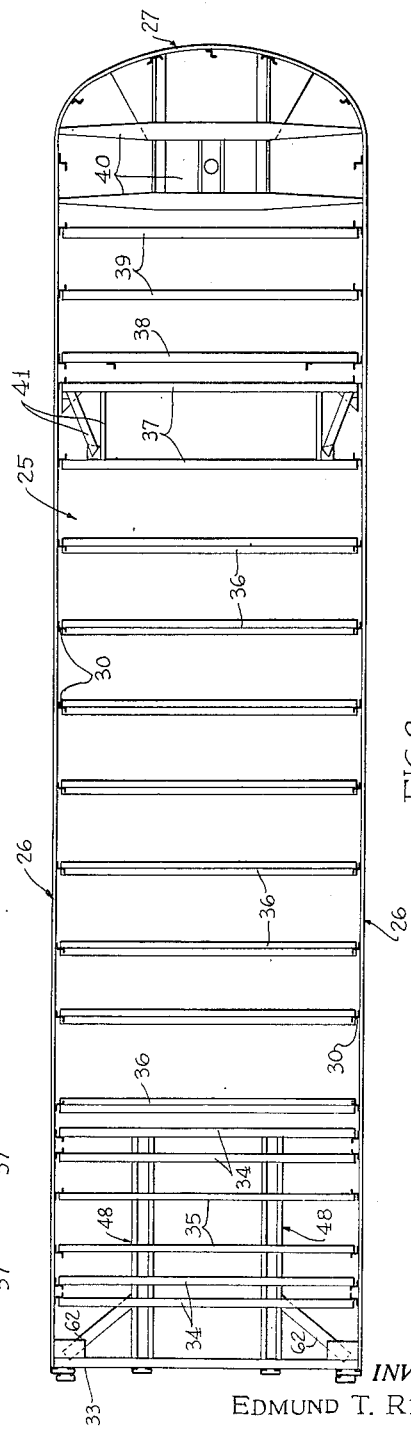
INVENTOR
EDMUND T. RIDGWAY
BY Donald B Waite
ATTORNEY Dec. 9, 1952 E. T. RIDGWAY 2,621,059
UNDERFRAME STRUCTURE FOR LAND VEHICLES, ESPECIALLY TRAILERS
Filed March 3, 1948 4 Sheets-Sheet 2
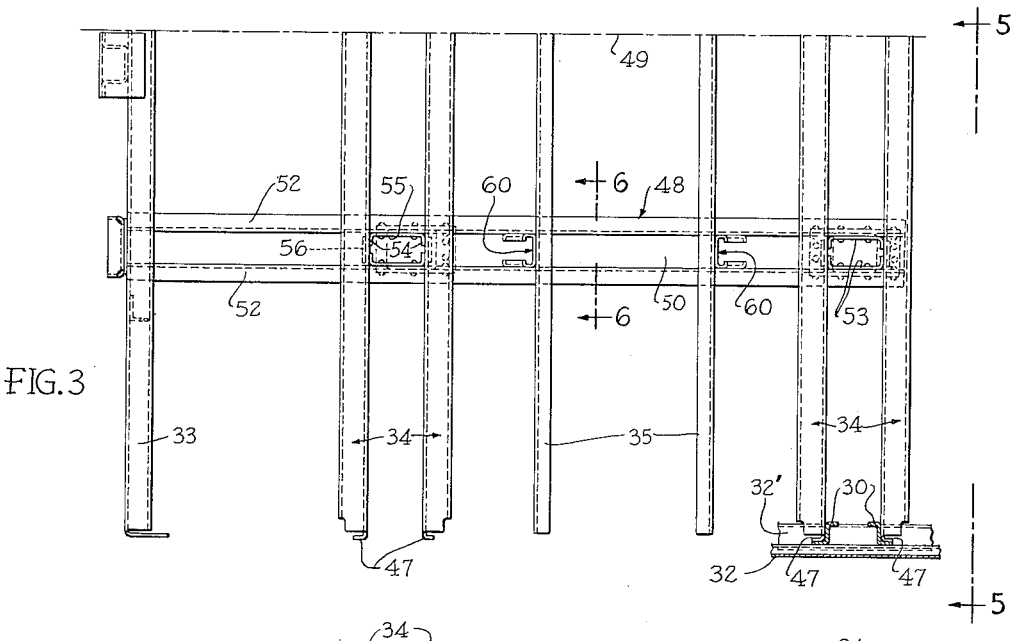
FIG.3
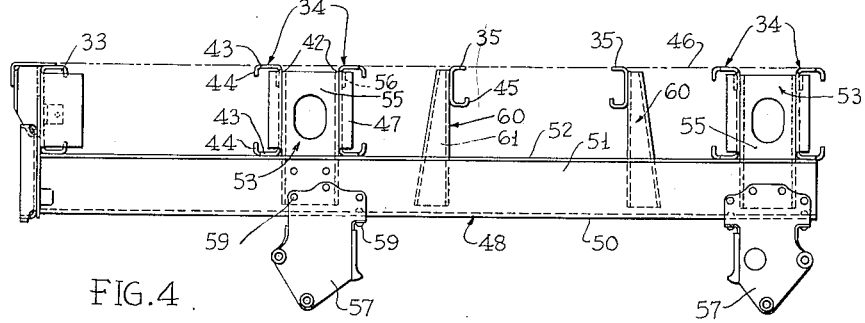
FIG.4
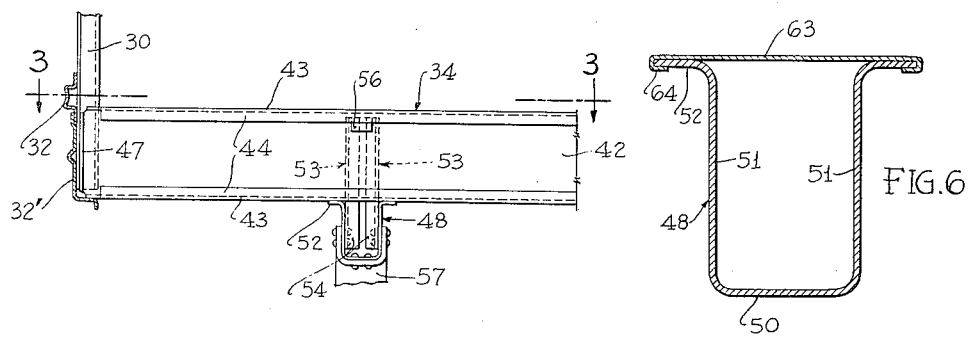
FIG.5
FIG.6
INVENTOR
EDMUND T. RIDGWAY
BY *Donald B Waite*
ATTORNEY

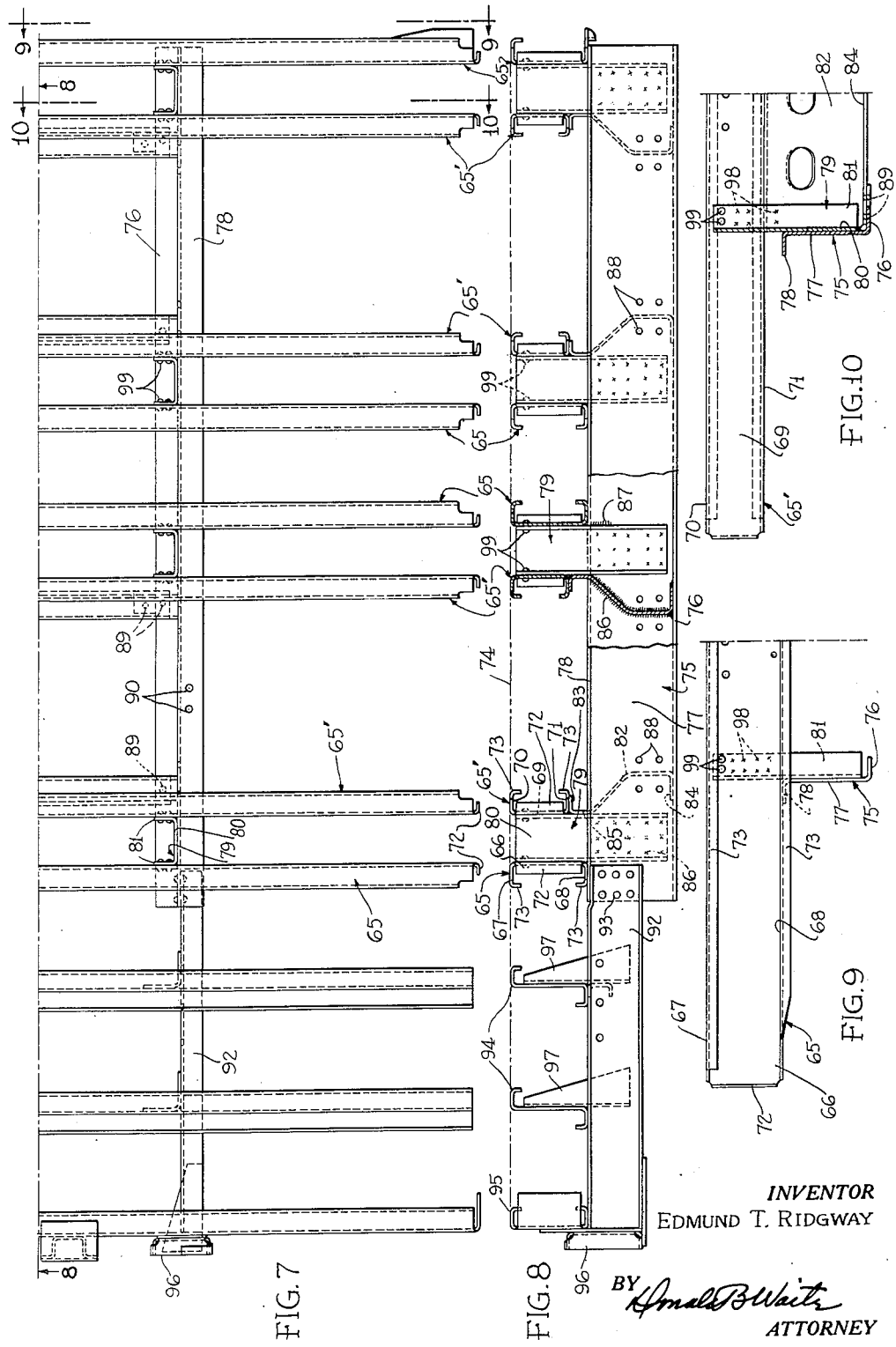
Dec. 9, 1952    E. T. RIDGWAY    2,621,059
UNDERFRAME STRUCTURE FOR LAND VEHICLES, ESPECIALLY TRAILERS
Filed March 3, 1948    4 Sheets-Sheet 3
INVENTOR
EDMUND T. RIDGWAY
BY Arnold B. Waite
ATTORNEY

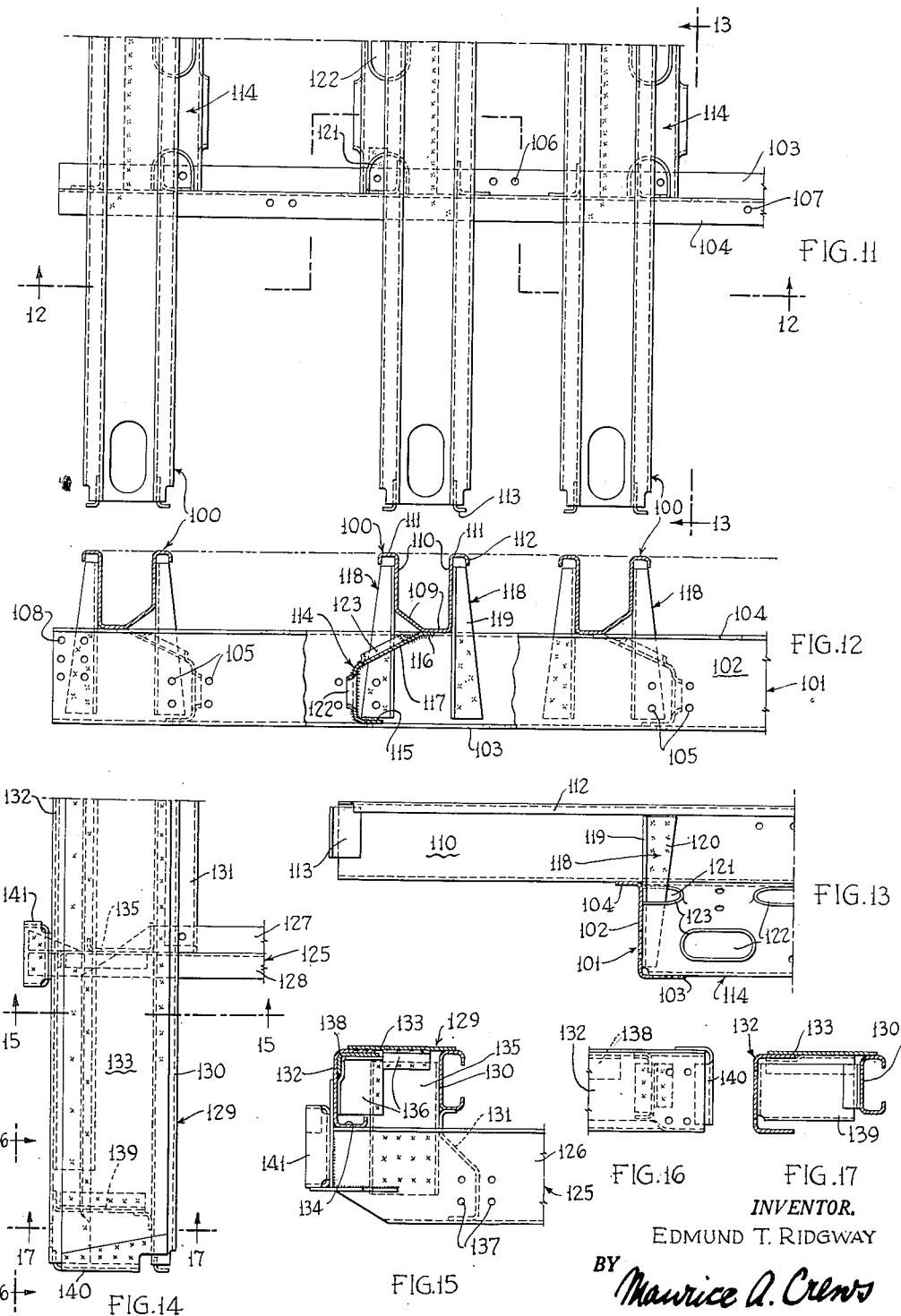

Patented Dec. 9, 1952

2,621,059

UNITED STATES PATENT OFFICE 2,621,059

UNDERFRAME STRUCTURE FOR LAND VEHICLES, ESPECIALLY TRAILERS

Edmund T. Ridgway, Oaklyn, N. J., assignor to The Budd Company, Philadelphia, Pa., a corporation of Pennsylvania Application March 3, 1948, Serial No. 12,840

14 Claims. (Cl. 280—106)

1

This is a continuation-in-part of applicant's original application Serial No. 704,945, filed October 22, 1946, for "Underframe Structure for Vehicles, Especially Trailers," abandoned April 3, 1948.

The invention relates to an underframe structure for land vehicles, especially trailers.

More specifically, the invention relates to that part of a vehicle underframe to which the wheel suspension is attached, such as for instance, the suspension for the rear wheels of a trailer or semi-trailer.

Furthermore, the invention relates more specifically to that type of vehicle structure which is called "self-supporting," that is, the type in which the body bottom structure, preferably together with the upright walls and the roof, performs simultaneously the functions of the chassis, so that a separate chassis is dispensed with.

Among the objects of the invention is an underframe structure of the indicated type which is light in weight, which is easy to assemble of relatively simple elements, which lends itself to manufacture of sheet metal, preferably high-tensile material such as cold worked stainless steel, which also lends itself joinder of the members entering into the structure by means of electric spot welding, and in which the connections between the different parts are substantially free of unbalanced forces tending to deform the elements and to destroy the connections between them.

For achieving the above outlined and other objects and advantages, the invention contemplates providing the underframe structure of a land vehicle with one or more transverse beam structures each equipped with a pair of vertically and transversely extending longitudinally closely spaced webs, providing longitudinally extending transversely spaced sill members beneath said beam structures so that the beam structures and the sill members intersect each other at least approximately in zones of attachment of wheel supporting means, and providing vertical connecting members secured to both webs of each beam structure and to the longitudinal sill members at their intersection, thereby balancing the forces transmitted to the transverse beam structures from the wheel supporting means and the longitudinal sill members.

The invention also contemplates the use of the aforesaid construction in combination with longitudinal sill members having two transversely spaced upright walls or webs, to both of which the vertical connecting members are attached, so that the forces transmitted between the vertical

2 member and the longitudinal member also will be balanced.

Another way, contemplated by this invention, of balancing the stresses transmitted into two longitudinal sills each having but one vertical web, consists in interconnecting the webs of the two sills by transverse structures aligned with the cross beam structures preferably in the form of members having a transversely and vertically arranged web.

The above outlined and further objects, advantages and features of the invention will be more easily understood or will become apparent from the attached drawing showing several embodiments of the invention, and from the following description of such embodiments.

In the drawings,

Figure 1 is a diagrammatic side elevation of a single-axle trailer body built according to one embodiment of the invention;

Figure 2 is a diagrammatic plan view of the underframe construction of the body shown in Figure 1, indicating diagrammatically the upright posts in sections;

Figure 3 is a plan view of one-half of the rear end of the underframe shown in Figure 2, but on a larger scale, with a fragmentary section of the side wall along line 3—3 of Figure 5;

Figure 4 is a side elevation of the underframe part shown in Figure 3;

Figure 5 is a fragmentary front elevation of the underframe viewed in the direction of the arrows 5—5 in Figure 3 and a section through the adjoining part of the side wall;

Figure 6 is a transverse section along line 6—6 of Figure 3 through one of the longitudinal sill members with an additional cover member;

Figure 7 is a fragmentary plan view of another embodiment of the invention adapted for the attachment of two axles arranged closely the one behind the other, this view corresponding substantially to Figure 3 of the first embodiment;

Figure 8 is a side elevation, and a partial section along the longitudinal center line 8—8, of the frame shown in Figure 7.

Figure 9 is a fragmentary end elevation viewed in the direction of the arrows 9—9 of Figure 7;

Figure 10 is a section along line 10—10 of Figure 7;

Figure 11 is a fragmentary plan view of a still further embodiment, this view showing only three of the four cross beam structures arranged generally at the same locations as shown in Figure 7;

Figure 12 is a fragmentary side elevation and section along line 12—12 of Figure 11;

Figure 13 is a fragmentary transverse elevation and section along line 13—13 of Figure 11;

Figure 14 is a fragmentary plan view showing a modification of a detail which is applicable to either one of the constructions illustrated in Figures 7 to 10 and 11 to 13, the modification concerning only the end transverse beam structure; and Figures 15 to 17 are fragmentary sections and elevations taken along or viewed in the direction of the arrows on the correspondingly numbered lines of Figure 14.

The trailer illustrated in Figures 1 to 6 is of the self-supporting type. It comprises a bottom or underframe structure 25, side walls 26, a front wall 27, and a roof 29. The rear wall is formed by doors, which are not shown, and there may be a door provided in one or both side walls. In general, the construction of this trailer may be similar to the construction disclosed in Patent No. 2,172,571, R. J. Theriault, "Vehicle," of September 12, 1935; that is, it has side walls composed of posts 30, longitudinally corrugated panels 31 (the corrugations not being indicated in the drawing), a rub rail 32 and a skirt 32', a similarly constructed front wall 27, and a roof composed of transverse carlines and longitudinally corrugated sheathing (which are not shown).

The lower margins of the side walls which form the main load-supporting elements are interconnected in the region of the lower ends of the posts 30 by transverse beams 33, 34, 35, 36, 37, 38 and 39 and by a so-called "fifth wheel" structure 40. Those cross members which are substantially identical in purpose and construction are designated throughout by the same numeral, whereas those which have specific functions and formations are designated by different numerals. It will be noted, for instance, that the cross members 37 are interbraced by members 41, and these cross members with their braces, together with cross members 38, serve for the attachment of the landing gear (not shown). There is no need to describe the entire front portion of the trailer forward from the rearmost cross member 36 because the construction in this region may be conventional and is interesting only insofar as it exemplifies the type of construction for which the invention proper is outstandingly designated, or which as a whole may be considered as one of the combination elements of the invention.

The rear end cross member 33 is a forwardly facing channel with inturned marginal flanges and constitutes part of the threshold for the rear doors. The cross members 34 may be of substantially the same height and cross-sectional form as the cross members 33 and are arranged in pairs with a short longitudinal space between them. The cross members 34 of each pair have their bottom walls 42 turned toward each other, whereas their side walls 43 face in opposite directions and are provided with inturned flanges 44. The cross members 34 of each pair together form, in effect, one transverse beam structure having a pair of longitudinally spaced vertical webs.

The cross members 35 between the two pairs of cross members 34 may be of less height than the latter and may be constituted by channels having their open sides facing each other and having only the lower wall provided with an upturned flange 45. The top surface of all cross members is arranged in one plane indicated by the dot-and-dash line 46 (Figure 4) representing the underside of the floor (not shown) which is supported by the cross braces. The bottom walls 42 of the cross braces and longitudinal end extensions 47 thereof are attached to the web and one arm of the Z-section posts 30, as shown in Figures 3 and 5.

Longitudinal sill members 48, which are equally spaced from the longitudinal center line 49 of the vehicle, extend from the rear end cross member 33 to the foremost one of cross members 34. These sills 48 are inverted hat sections having a bottom wall 50, side walls 51, and top flanges 52, which latter abut the underside of the lower walls 43 of the beams or cross braces 33 and 34 and are secured to them, preferably by electric spot welding.

At the intersection of each sill 48 with each transverse beam structure of pairs of cross members 34, a pair of vertical channel sections 53 with their side walls 54 are fitted between the bottom walls 42 of the members 34 and with their bottom walls 55 against the side walls 51 of the longitudinal sills 48. The overlapping surfaces are connected with each other, preferably by electric spot welding, and the members 34 are locally reinforced each by a plate 56 in the upper region opposite the attachment of the walls 54.

It is in these regions of interconnection of the transverse members 34 to the longitudinal members 48 by the vertical members 53 that the brackets 57 for the wheel supporting springs (not shown) are attached. These brackets embrace the bottom and side walls of sill members 48 and are secured to them by rivets 59, some of which also pass through the bottom walls 55 of the interconnecting members 53.

The springs for supporting the axle and the means for relatively guiding the axle and underframe are not illustrated because they may be of any well known design. Of course, the specific form of the brackets will be selected to fit the spring and guiding means.

The cross members 35 have their bottom walls connected to the bottom walls of vertical channel section members 60, the side walls 61 of which have their lower portions secured to the side walls 51 of the longitudinal sills 48.

On account of the arrangement of the cross members 34 in pairs, the provision of the longitudinal sills 48 with transversely spaced side walls 51, and the interconnection of the transverse and longitudinal sills 34, 48 by vertical members secured to both side walls 51 of sills 48 and to the bottom walls 42 of both members 34 of each pair, all stresses transmitted between the brackets 57 and the vehicle structure will be balanced; that is, no torsional forces will be transmitted which might tend to deform the members made of relatively thin-gauged sheet material, and the kind of stresses on the connecting welds for which such welds are ill-adapted are largely eliminated. This is especially important for structures which have to stand up under prolonged severe service conditions.

The rear corners of the understructure may be reinforced by diagonal braces 62 which have their inner ends fastened to the rearward transverse members 34 at their intersections with the longitudinal members 48.

So as to avoid accumulation of dirt in the upwardly facing hat sections 48, cover members 63 of thin sheet metal may be provided (Figure 6). These cover members (for clarity's sake not shown in Figures 2 to 5) are of a length and a form to fit between the successive transverse members or their connecting structures, such as 60, and have their margins 64 crimped around the flanges 52 of the longitudinal sills 48. The members 63, as well as the rest of the disclosed construction, may be made advantageously of austenitic stainless steel, such as the type containing 18% chromium and 8% nickel. The members 63, while sufficiently strong to be firmly held in place and not easily deformed, are so thin that they do not materially add to the weight and that they can be easily detached by bending up their margins 64 with appropriate tools when, for repair or other purposes, access to the interior of the sills 48 is required. On the other hand, the weight of dirt which customarily accumulates in upwardly facing open sections is much greater than the weight of the covers 63. The members 63 need not be of the variety of stainless steel which is strengthened by cold working, which latter is preferably the case for the structural members of the vehicle, including the longitudinal sills 48 and the cross members 34.

Only the rearward portion of the bottom framework of the second embodiment, that is, the portion in the wheel attachment zone, is illustrated in Figures 7 to 10. The forward portion of the bottom structure, the side walls, the front wall, and the roof, may be of a construction substantially identical with the construction described and illustrated for the first embodiment. This second embodiment is designed for a pair of rear axles, although similar constructions may also be used for a single axle. Of course, the construction shown in the first embodiment also could be transformed for use with more than one axle by mere extension of the longitudinal sills and by increasing the number of pairs of cross members.

The construction shown in Figures 7 to 10 has four pairs of cross members in the supporting zone, each pair comprising a cross member 65 and another cross member 65'. Here too, each pair of cross members may be considered as one transverse beam structure having a pair of transversely spaced vertically and transversely arranged webs. The cross members 65 are of relatively great height, that is, of a height substantially identical with the height of the cross members 34 of the first embodiment. The members 65 each have a vertical bottom wall 66 and horizontal side walls 67 and 68. The other cross member 65' of each pair is of less height and has a bottom wall 69 and side walls 70 and 71. Both members have the ends of their bottom walls provided with flanges 72 for the attachment of the posts, as described for the first embodiment, and have their side walls reinforced by flanges 73. The top walls 67 and 70 of the transverse sills are arranged at the level of the underside 74 of the floor (not shown).

All four pairs of sills 65, 65' are interconnected by a pair of longitudinal sill members 75 of Z-section, each having a lower horizontal arm 76, a vertical web 77, and an upper horizontal arm 78. The lower wall 68 of each sill 65 rests on and is secured, such as by electric spot welding, to the arms 78 of the longitudinal members 75. Inserted between each two appertaining cross members 65, 65' is a vertically arranged U-section member 79 which has its bottom wall or web 80 secured to the web 77 of the respective longitudinal sill and its side walls 81 secured to the bottom walls 66, 69 of the cross members in a fashion similar to that described for the vertical members 53 of the first embodiment.

The cross members 65' are supplemented in the region between the two longitudinal members 75 by short transverse members 82 generally of S-section. The top wall 83 of each member 82 abuts the underside and is secured, such as by spot welding, to the side wall 71 of the respective sill 65', rests and is secured by the ends of its lower arm 84 on the lower arms 76 of the longitudinal sills 75, has its upper vertical wall portion 85 secured to arm 81 of the adjoining vertical connecting member 79 and may be additionally secured by its end margins to the webs 77 of the longitudinal members by fusion welding, such as electric arc welding, as indicated at 86. Also the member 79 may be additionally attached to the web of the side sill by fusion welding, indicated at 87. The transverse members 82 of this embodiment help in balancing eccentric stresses exerted on one of the longitudinal sills by transferring the moment to the web of the other sill.

The holes 88, 89 and 90 mark the regions in which the wheel suspension members (not shown) are attached to the longitudinal sill members. Here again—on account of the arrangement of the transverse members in pairs, of the interconnection of the transverse members by a pair of longitudinal members, and of the vertical members interconnecting the transverse members of each pair with each other and with the longitudinal members—a transmission of the stresses from the wheel suspension points to the body structure is achieved which is substantially free of unbalanced stresses which might tend to deform the sheet metal members and to destroy the connection between them.

One standard construction of the type so far described for Figures 7 to 10 may be adapted to different lengths of vehicles and used to transmit collision shocks from the rear end of the vehicle into a large portion of the underframe and especially into the longitudinal members 75. For this purpose, the members 75 are extended by separately made channel section members 92. The members 92 have their ends overlappingly secured to the vertical webs 77 of the sills 75 by rivets 93. These sill extensions 92 are connected to intermediate transverse sills 94 and to the transverse end sill 95 and carry the buffer supports 96 at their ends. Angle section vertical members 97 reinforce the connection between the members 92 and 94.

Depending upon the length of the vehicle and the arrangement of the axle or axles relative to the rear end, the sills 75 may be used without extensions 92 or with extensions 92 of different lengths. In any event, the construction and the dimensions of the sills 75 and the cross members 65, 65' may be standard whatever the length of the vehicle to the rear may be. Of course, sill extensions corresponding to the members 92 might also be used in combination with the first embodiment.

The spot welds 98 connecting the vertical members 79 with the transverse members 65, 65' are subject to stresses which might tend to destroy the uppermost spot welds. For effectively protecting the weld pattern 98 against such undesirable influences, the upper ends of members 79 are connected to the cross members 65, 65' by rivets 99 rather than by spot welds, see Figures 7 to 10.

In the embodiment illustrated in Figures 11 to 13, the arrangement of the transverse beam structures 100 and the arrangement and shape of the longitudinal sills 101 are substantially identical with the corresponding features of the embodiment illustrated in Figures 7 to 10. The differences between the two embodiments reside mainly in the shape of the transverse beam structures and the connecting means between them and the longitudinal sills.

The Z-section longitudinal sills 101 have a vertical web 102, a lower horizontal arm 103, and an upper horizontal arm 104. Holes 105, 106, and 107 corresponding to the holes 88 to 90 of the preceding embodiment serve for the attachment of the wheel supporting means, such as brackets for springs or axle guiding arms (not shown). The holes 108 serve for the securement of a rearward underframe extension which may be identical with the extension of the preceding embodiment which is composed of the members 92 to 97.

Each cross beam structure 100 consists mainly of a single upwardly facing U-section member having a bottom wall 109, side walls 110, and lateral upper flanges 111 reinforced by downwardly directed marginal flanges 112. It will be easily understood that the vertical arms or webs 110 with the flanges 111, 112 correspond to the webs and the flanges 43, 44 of the two separate members 34 of the first embodiment, Figures 3 to 5, or to the webs 66, 69 and the flanges 67, 70, 73 of the two separate members 65, 65' of the second embodiment, Figures 7 to 10. The lower flanges of the separate members of the first two embodiments 43, 44 and 68, 71, 73 of the preceding embodiment are, however, substituted in the third embodiment by the bottom wall 109 interconnecting the vertical walls or webs 110.

The ends of the webs 110 are provided with angle members 113 serving for the securement to the side wall structures, especially the side wall posts, as illustrated for the members 47 in Figure 3.

The transverse beam structures 100 are each supplemented by a member 114 extending between the webs 102 of the two side sills 101. A bottom flange 115 of each member 114 rests on and is secured to the bottom flanges 103 of the side sills while a top flange 116 is secured to the underside of the bottom wall 109 of the beam structure 100. The flange 116 is an extension of the inclined upper wall 117 of the member 114 which, as a whole, presents a horizontally facing channel section.

The bottom walls 109 are secured to the top flange 104 of the side sills. Pairs of vertical angle section members 118 have their longitudinally extending arms 119 secured to the webs 102 of the sills 101 and their transversely extending arms or webs 120 secured to the vertical walls or webs 110 of the transverse beam structures. So as to permit the unobstructed extension of one of the members 118 of each pair into the interior of the member 114, the wall 117 of the latter has its ends provided with cutouts 121. Further cutouts 122, all of which are provided with marginal reinforcing flanges 123, serve for weight reduction. It will be noted that certain of the holes 105 and 108 for the wheel supporting means and the sill extensions pass through the flange 119 of connecting members 118.

Figures 14 to 17 illustrate a modification which may be used with either of the embodiments illustrated in Figures 7 to 10 or 11 to 13 in the event that the vehicle ends at about the rearmost wheel supporting zone so that no extension member, as exemplified by the members 92 to 97 of Figures 7 and 8, is required. Except for the rearmost transverse beam structure, the entire underframe may be identical with that shown in Figures 11 to 13.

The Z-section side sill 125 of Figures 14 and 15 has a vertical web 126 and bottom and top arms 127, 128. The rearmost cross member or transverse beam structure 129 interconnecting the sills 125 is composed of a forwardly facing C-section 130, an S-section member 131 between the sills 125, a rearwardly spaced second U- or C-section member 132, and a plate 133 bridging the space between the two members 130, 132 and secured to their upper arms. The members 125, 130 and 131 are substantially identical with the members 75, 65', and 82 of Figures 7 to 10, so that they do not require further description in regard to their construction and connection with each other.

The rearward member 132 has its lower arm 134 overlappingly secured to the top arm 128 of each sill 125. Members 135, 136 are overlappingly secured to the vertical webs of the sills 125 and the transverse members 130, 132 of the transverse beam structure 129. Consequently, the stresses transmitted from the wheel attachment zone represented by the holes 137 are balanced by their transmission into the webs of both members 130, 132.

The member 132 is interiorly reinforced by an angle section 138, and the end of the beam structure is reinforced by a bracket or bulkhead 139 and a closing member 140. The overlapping connection of the different members with each other by spot welding is clearly shown in the drawings and, therefore, does not require more detailed description. 141 is a bumper plate secured to the end of each sill 125 and the rear surface of the transverse member 132.

The gusset members 53 of Figures 1 to 5 and the gusset members 79 of Figures 7 to 10, by the upper portions of their longitudinal vertical webs 55 and 80, respectively, constitute means for bracing the webs of the beam structures 34 and 65, 65' against each other. A similar function is performed in the embodiment in Figures 11 to 13 by the horizontal bottom wall 109 of the cross beam structures 100.

The invention is not restricted to the details of the illustrated and described embodiments, but is susceptible to further modifications and adaptations, protection being sought for the invention as expressed by the spirit and the language of the attached claims.

What is claimed is:

1. In an underframe construction of a land vehicle, a plurality of longitudinally spaced transverse beam structures and beneath the latter a pair of transversely spaced longitudinal sills, said beam structures having two vertically and transversely extending webs closely spaced from each other in longitudinal direction, said sills each having a longitudinally and vertically extending web, and gusset members extending vertically across the intersections of said beam structures and said sills and being overlappingly secured to all the webs thereof, the sills presenting themselves at the intersections with said beam structures and said gusset members for the attachment of wheel supporting means whence stresses are transferred in balanced manner into the two webs of the transverse beam structures.

2. In an underframe construction for land vehicles, a plurality of longitudinally spaced transverse beam structures and beneath the latter a pair of transversely spaced longitudinal sills, said beam structures having two vertically and transversely extending webs closely spaced from each other in longitudinal direction, each of said sills having a longitudinally and vertically extending web, gusset members extending vertically across the intersections of said beam structures and said sills and being overlappingly secured to the two webs of said beam structures and to said web of said sills, and means bracing said two webs of each of said beam structures against each other at the location of said gusset members, the sills presenting their regions of intersection and connection with said beam structures and said gusset members for the attachment of wheel supporting means whence stresses are transferred in balanced manner into the two webs of the transverse beam structures.

3. In a land vehicle of the type having load-supporting longitudinal side structures interconnected by transverse underframe beam structures in the form of thin-walled sections with vertically arranged webs, at least certain ones of said beam structures having two webs arranged with small spacing between them in the longitudinal direction of the frame, a longitudinal sill structure with transversely spaced vertical webs arranged beneath said beams, vertical members having transversely and longitudinally extending webs connected to the vertical pairs of webs of said beam structures and of said longitudinal sill structure, said beam and sill structures being arranged so that they cross each other in the attachment zones of wheel supporting means.

4. In a land vehicle of the type having load-supporting longitudinal side structures interconnected by transverse underframe beam structures in the form of thin-walled sections with vertically arranged webs, at least some of said beam structures having small spacing in the longitudinal direction of the frame between their vertical webs, a pair of longitudinal sills having transversely closely spaced vertical webs and being arranged beneath said beams, vertical members having transversely and longitudinally extending webs connected to the said closely spaced webs of said beam structures and of said longitudinal sills.

5. In a land vehicle of the type having load-supporting body side walls interconnected by transverse underframe beams which have a vertical web, the arrangement of at least one pair of said beams with small longitudinal spacing of their vertical webs, a longitudinal sill arranged beneath such pair of transverse beams having a vertical web, a vertical member having transversely extending webs and a longitudinally extending web connected, respectively, to the vertical webs of said pair of transverse beams and to the vertical web of the longitudinal sill.

6. In an underframe for a land vehicle, cross braces having angle cross section with a lower horizontal arm and an upright arm and arranged in pairs with small spacing between their upright arms and with their horizontal arms extending in opposite directions, a pair of transversely spaced longitudinal sills arranged beneath such pairs of cross braces and each having an upright web and an upper horizontal arm, said horizontal arms of said braces and sills being overlappingly connected with each other, and vertically extending means having webs extending in vertical transverse and vertical longitudinal planes, which webs are connected to the upright arms of the paired braces and to the upright webs of the longitudinal sills respectively.

7. In a self-supporting land vehicle body having side wall structures and transverse floor members interconnecting the lower margins of the said structures, at least some of said transverse members being arranged in pairs and having channel section, the arrangement being such that the side walls of the transverse members of one pair are directed away from each other and that the outsides of the bottom walls face each other with small longitudinal spacing, a pair of longitudinal sills each arranged between one of said side wall structures and the center line of the body, each longitudinal sill having transversely spaced vertical walls and being arranged beneath and secured to the underside of said transverse members, pairs of vertical members at each intersection between a pair of floor members and a sill, said vertical members having transversely extending marginal walls interconnected by a generally longitudinally extending web, which walls are secured to the bottom walls of said transverse members of one pair and which webs are secured to the vertical walls of the longitudinal sills.

8. In a land vehicle underframe, a plurality of longitudinally spaced transverse beams adapted for connection of their ends to longitudinal side structures, at least some of said beams having vertical webs and being arranged in pairs with closer spacing between them than between other beams, a longitudinal sill structure arranged beneath said transverse beams at a distance from the latter's ends and having a pair of vertical webs, means having webs extending, respectively, in vertical transverse planes and vertical longitudinal planes, said means being arranged at the intersections of said pairs of beams and said webs of said sill structure and having their webs secured, respectively, to said webs of said beams and said sill structure.

9. In a self-supporting land vehicle body having side wall structures and transverse structures interconnecting the lower margins of the said wall structures, at least some of said transverse structures having two upright webs which have small longitudinal space between each other, a pair of longitudinal sill structures each arranged between one of said side wall structures and the center line of the vehicle, each longitudinal sill structure having transversely spaced vertical walls and being arranged beneath and secured to the underside of said transverse structures, a gusset structure at each intersection of said transverse and said sill structures, said gusset structures having transversely and vertically extending webs and generally longitudinally and vertically extending webs by which they are secured to the webs of said transverse structures and the vertical walls of the longitudinal sill structures.

10. In a land vehicle underframe, a plurality of longitudinally spaced transverse beams adapted for connection of their ends to longitudinal side structures, at least some of said beams having vertical webs and being arranged in pairs with closer spacing between them than between other beams, a pair of longitudinal sills arranged beneath said transverse beams at a distance from each other, inwardly spaced from the ends of the beams and having a vertical web, a plurality of means having webs extending, respectively, in vertical transverse planes and a vertical longitudinal plane, each one of said means being arranged at each intersection of one of said pairs of beams and one of said sills and having their webs secured, respectively, to said webs of said beams and said sills, said sills being adapted in the regions of their intersections with said beams for the attachment of wheel supporting means.

11. In a land vehicle underframe, cross braces of angle cross section with a lower horizontal arm and an upright arm and arranged in pairs with small spacing between their upright arms and with their horizontal arms extending in opposite directions, a pair of transversely spaced longitudinal sills arranged beneath such pair of transverse braces and each having a vertical wall and an upper horizontal wall, said horizontal arms of said braces and said horizontal walls of said sills being overlappingly connected with each other, means having transversely and longitudinally extending vertical webs connected to the vertical arms of the paired braces and to the vertical walls of the longitudinal sills, respectively, and angle section members having one arm overlappingly secured to the horizontal arms of at least some of said braces and the other arm fitted between and secured to said sills.

12. In a land vehicle underframe, cross brace structures having lower horizontal webs and upright vertical walls, said upright walls of at least certain of said structures being arranged with small spacing between them, a pair of transversely spaced longitudinal sills arranged beneath said transverse brace structures and each having an upright wall and an upper horizontal wall, said horizontal webs of said brace structures and said horizontal walls of said sills being overlappingly connected with each other, means having transversely and longitudinally extending vertical webs connected to the vertical walls of the brace structures and the longitudinal sills, respectively, and transverse members having an upright web fitted between and secured to the upright walls of said sills in the regions of at least certain of said brace structures.

13. In a land vehicle underframe, cross brace structures of channel cross section with a lower horizontal wall and closely spaced upright vertical walls, a pair of transversely spaced longitudinal sills arranged beneath said transverse brace structures and each having an upright wall and an upper horizontal wall, said horizontal walls of said brace structures and said sills being overlappingly connected with each other, gusset means having transversely and longitudinally extending vertical webs connected to the vertical walls of the brace structures and the longitudinal sills, respectively, and transverse members of angle section fitted between and secured to the upright walls of said sills in the regions of at least some of said brace structures, said transverse members having one of their arms cut out for the passage of said gusset means.

14. In a land vehicle underframe, cross brace structures comprising a lower horizontal arm and two upright arms which have small spacing between them, a pair of transversely spaced longitudinal sills arranged beneath said brace structures and each having a vertical wall and an upper horizontal wall, said horizontal arms of said brace structures and said horizontal walls of said sills being overlappingly connected with each other, means having transversely and longitudinally extending vertical webs connected to both upright arms of the brace structures and to the vertical walls of the longitudinal sills, respectively, and angle section members having one arm overlappingly secured to the horizontal arm of at least some of said brace structures and the other arm fitted between and secured to said sills.

EDMUND T. RIDGWAY.

REFERENCES CITED

The following references are of record in the file of this patent:

UNITED STATES PATENTS

| Number | Name | Date |
| --- | --- | --- |
| 2,256,037 | Reid | Sept. 16, 1941 |
| 2,275,349 | Collender | Mar. 3, 1942 |
| 2,329,408 | Minium | Sept. 14, 1943 |
| 2,366,709 | Dean | Jan. 9, 1945 |